United States Patent
Ajay

(10) Patent No.: US 11,804,118 B2
(45) Date of Patent: Oct. 31, 2023

(54) ASPIRATING SMOKE DETECTOR DISCREET SAMPLE POINT

(71) Applicant: Honeywell International Inc., Charlotte, NC (US)

(72) Inventor: Kemal Ajay, Mount Waverley (AU)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 17/683,591

(22) Filed: Mar. 1, 2022

(65) Prior Publication Data

US 2023/0282087 A1    Sep. 7, 2023

(51) Int. Cl.
*G08B 17/113*    (2006.01)
*G01N 21/53*    (2006.01)

(52) U.S. Cl.
CPC .......... *G08B 17/113* (2013.01); *G01N 21/53* (2013.01)

(58) Field of Classification Search
None
See application file for complete search history.

(56) References Cited

U.S. PATENT DOCUMENTS

| | | | |
|---|---|---|---|
| 4,524,917 A | 6/1985 | Williams | |
| 5,103,212 A * | 4/1992 | Notarianni | G01N 1/26 340/628 |
| 5,163,332 A * | 11/1992 | Wong | G01N 21/255 250/338.5 |
| 5,477,218 A * | 12/1995 | Manmoto | G08B 17/107 340/630 |
| 6,940,402 B1 * | 9/2005 | Lewis | G08B 17/10 340/630 |
| 7,397,342 B2 * | 7/2008 | Mullet | G07C 9/00182 340/5.23 |
| 7,969,308 B2 | 6/2011 | Cotton | |
| 8,098,166 B2 * | 1/2012 | Lang | G08B 17/10 340/630 |
| 9,746,363 B2 * | 8/2017 | Ajay | G08B 17/10 |
| 9,978,265 B2 * | 5/2018 | McNabb | G08C 17/02 |
| D820,709 S * | 6/2018 | Joseph | D10/121 |
| 10,161,837 B2 * | 12/2018 | Ajay | G08B 17/113 |
| 10,191,025 B2 * | 1/2019 | Al Azri | G01N 1/2273 |
| 10,317,319 B2 * | 6/2019 | Joseph | G01N 1/2273 |
| 10,380,875 B1 * | 8/2019 | Roberts | G08B 7/06 |
| 10,520,133 B1 * | 12/2019 | Levine | G08B 17/10 |
| 10,821,222 B2 | 11/2020 | Panan et al. | |
| 10,934,763 B2 * | 3/2021 | Fitzgibbon | E05F 15/43 |

(Continued)

FOREIGN PATENT DOCUMENTS

| EP | 1085990 A1 | 3/2001 |
|---|---|---|
| WO | 9942308 A1 | 8/1999 |

*Primary Examiner* — Muhammad Adnan
(74) *Attorney, Agent, or Firm* — Brooks, Cameron & Huebsch, PLLC

(57) ABSTRACT

Smoke detection sample points and systems are described herein. One smoke detection sample point includes a body having a chamber formed within the body, a first air flow conduit formed within the body having two ends and the ends being open, to allow air to pass through the first air flow conduit between an area to be sampled and the chamber, and a second air flow conduit formed within the body having two ends with one end being open and having an air seal, to prevent air from passing through the second air flow conduit between the area to be sampled and the chamber.

18 Claims, 2 Drawing Sheets

(56) References Cited

U.S. PATENT DOCUMENTS

| | | | |
|---|---|---|---|
| 11,002,579 B2* | 5/2021 | Ajay | G01F 1/66 |
| 11,385,212 B2* | 7/2022 | Ajay | G08B 17/113 |
| 11,402,812 B1* | 8/2022 | Fitzgibbon | G06F 3/04883 |
| 2004/0145484 A1* | 7/2004 | Wagner | G08B 17/10 |
| | | | 73/863.31 |
| 2005/0087027 A1* | 4/2005 | Widmer | G01N 1/2258 |
| | | | 73/863.02 |
| 2007/0176783 A1* | 8/2007 | Knox | G08B 29/145 |
| | | | 340/607 |
| 2008/0224886 A1* | 9/2008 | Rodriguez | G07C 9/00182 |
| | | | 340/13.28 |
| 2009/0237259 A1* | 9/2009 | Yokota | G08B 17/10 |
| | | | 340/628 |
| 2010/0194575 A1* | 8/2010 | Rodriguez | G08B 17/10 |
| | | | 340/628 |
| 2010/0206043 A1* | 8/2010 | Tewarson | G01N 30/08 |
| | | | 250/282 |
| 2014/0083168 A1 | 3/2014 | Parker et al. | |
| 2015/0096389 A1* | 4/2015 | Knox | G08B 17/113 |
| | | | 73/864.34 |
| 2015/0254953 A1 | 9/2015 | Gandara et al. | |
| 2015/0275564 A1* | 10/2015 | Rosenthal | H04W 4/80 |
| | | | 700/275 |
| 2015/0310717 A1* | 10/2015 | Al-Farra | G08B 17/02 |
| | | | 340/628 |
| 2016/0238495 A1* | 8/2016 | Joseph | G01N 1/26 |
| 2017/0045415 A1* | 2/2017 | Williamson | G01N 1/26 |
| 2018/0149559 A1* | 5/2018 | Williamson | G01N 1/2273 |
| 2018/0350220 A1* | 12/2018 | Gonzales | G08B 17/113 |
| 2019/0271185 A1* | 9/2019 | Fitzgibbon | E05F 15/41 |
| 2020/0020217 A1* | 1/2020 | Yan | G08B 29/18 |
| 2020/0340964 A1* | 10/2020 | Prozzo | G01F 3/224 |
| 2020/0402381 A1* | 12/2020 | Nelson | G08B 7/06 |
| 2021/0043055 A1* | 2/2021 | Matsukuma | G08B 29/20 |
| 2021/0165925 A1* | 6/2021 | Birnkrant | G06F 30/13 |
| 2021/0174659 A1* | 6/2021 | Hartwig | G01N 21/53 |
| 2021/0192913 A1* | 6/2021 | Escofet Via | G08B 17/10 |
| 2021/0270789 A1* | 9/2021 | Desjardins | G01N 33/0075 |

* cited by examiner

ASPIRATING SMOKE DETECTOR DISCREET SAMPLE POINT

TECHNICAL FIELD

The present disclosure relates to smoke detection, and in particular, sample point apparatuses for use in smoke detection systems.

BACKGROUND

Some smoke detection systems have a number of sample points spaced around a building that are connected via sampling tubes to a central analysis device that samples air taken from the sample points to determine if smoke or a fire is present in an area of the building. These systems are often referred to as aspirating smoke detection systems. For example, some such systems may be referred to in the industry as very early smoke detection apparatus (VESDA) systems.

Sample points typically have an apparatus body with a chamber formed therein. The chamber includes a first aperture, to allow air to pass between the area to be sampled and the chamber, and a second aperture to allow air to pass between the chamber and the tube, that is connected at its other end, to a central analysis device. The chamber also includes a one-way valve therein that allows inflow of air from the area to be sampled and restricts the outflow of air from the chamber.

As these systems draw air through the sample point to the central analysis device, the tube may become separated from the sampling chamber or may be damaged in such a way that air leaks into it from spaces other than that intended to be sampled. A condition of disconnection or leak is regarded as a fault condition and must be detected and the fault reported to a monitoring system.

In order to check for this fault condition, the system attempts to force air out through the sampling chamber by applying positive pressure with respect to the chamber environment. If the tube is undamaged and is connected fully to the sampling chamber, the flow in the tube is restricted by the one-way valve in the sampling-point chamber. If the system measures the tube outflow to be above a threshold, or if the measured back pressure is low, then the system determines that either there is a leak or that the sampling-point chamber has become partially or fully disconnected from the tube and raises a fault notification to the monitoring device.

DETAILED DESCRIPTION

Figure 1:
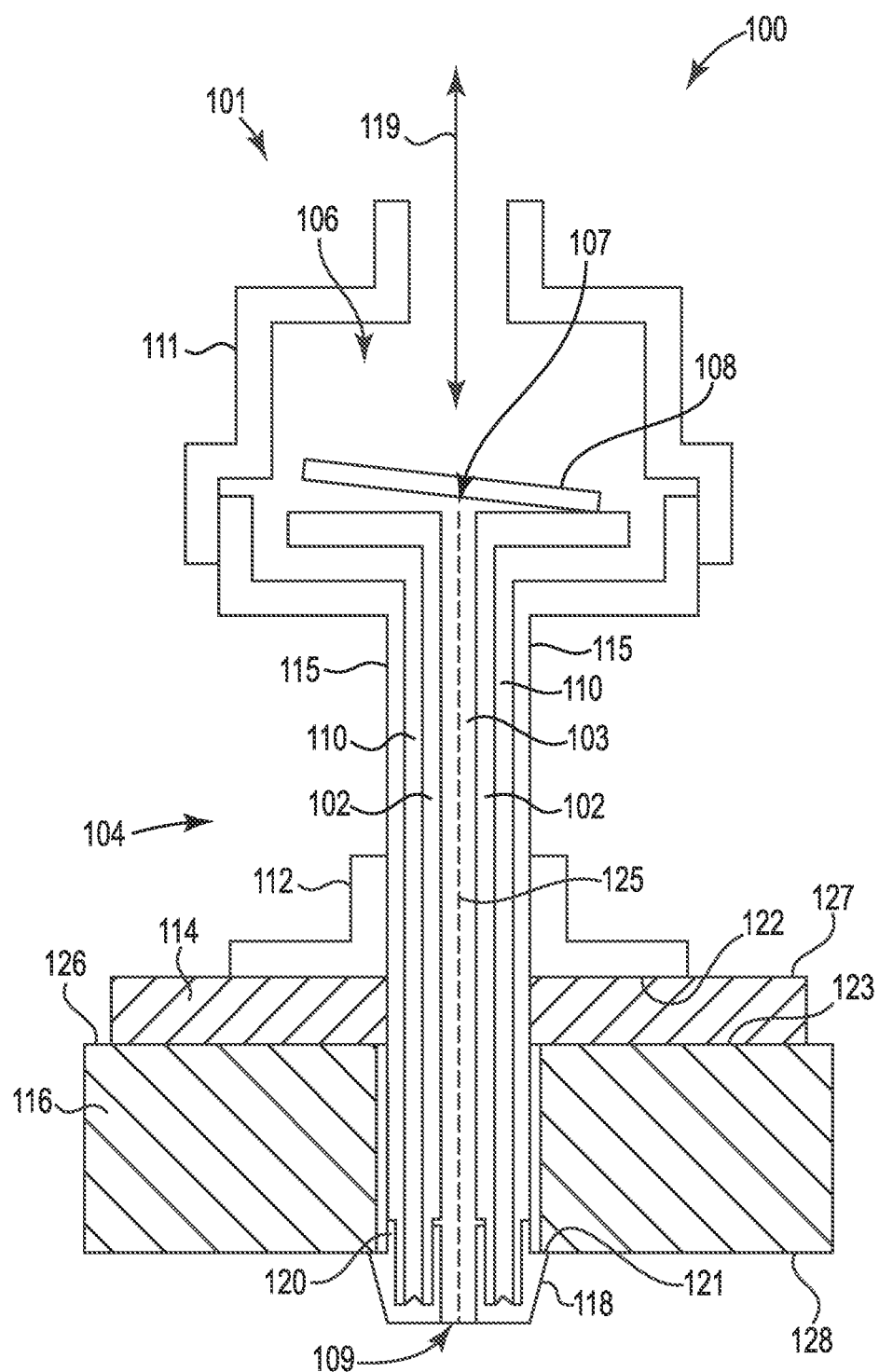
FIG. 1 illustrates a cutaway side view of a sample point according to an embodiment of the present disclosure wherein the sample point has an air seal that allows a valve to operate in an open (inflow) position.

As aspirating smoke detectors draw air from a remote location via a tube or pipe and analyze the air for smoke or other threats, in order to be sure that the sampling system is operating as intended, there must be a mechanism for determining if the sample point has been damaged or dislodged leading to air being sampled from a location other than the space intended. Once a sample point is correctly installed, the embodiments of the present disclosure allow the smoke detection system to check if it has become dislodged or otherwise damaged causing it to sample air from the wrong environment.

The sample point embodiments of the present disclosure are unique, for example, in that they are designed to break an air seal if the sample point is dislodged after it has been installed. The broken seal can be detected at the central smoke detection system raising an alert that the air may not be sampled from the intended area.

A technical benefit is that it supports central monitoring of correct operation of the system without having to visually check at the point of installation. This concept also supports a central maintenance value proposition as the detection of a malfunctioning sample point can be accomplished via central monitoring.

The embodiments of the present disclosure also allow for central monitoring while maintaining a small visible footprint at the point of detection (sample point). The installation would be seen as 'discreet' or unobtrusive and not disrupt the aesthetic and/or architectural intent of the area being monitored. This may be desirable in schools, prisons, hospital wards, or other facilities where occupants may wish to tamper with or deactivate the smoke detection system.

One beneficial aspect of the embodiments of the present disclosure is a break-away seal which will become dislodged if the sample point is removed from its installation point. In some embodiments, the sample point has a barbed seal or end cap. During installation, a hole of a suitable size is pre-drilled to allow the sample point and end cap to be pushed through. Once through, the sample point is fixed in place by adjusting a backing nut to keep the sample point in place.

Thereafter, if a substantial tension is applied to the sampling tube, due for example by the sampling tube being caught on someone's foot, and it is pulled out of its installation hole, the seal will dislodge as the seal barbs prevent it from passing through the hole. This exposes the monitored air path and the smoke detection system will detect that the seal is no longer in place and raise a fault alert.

As discussed above, smoke detection sample point and system embodiments are described herein. Embodiments of the present disclosure provide the above benefits by allowing for the system to reliably test for leaks as described in more detail below.

For example, in one embodiment, a smoke detection sample point includes a body having a chamber formed within the body (e.g., a chamber portion), a first air flow conduit formed within the body (e.g., a shaft portion) having two ends and the ends being open, to allow air to pass through the first air flow conduit between an area to be sampled and the chamber, and a second air flow conduit formed within the body having two ends with one end being open and having an air seal, to prevent air from passing through the second air flow conduit between the area to be sampled and the chamber. A valve is also positioned within the chamber. This and other embodiments will be described in more detail below.

In the following detailed description, reference is made to the accompanying drawings that form a part hereof. The drawings show, by way of illustration, how one or more embodiments of the disclosure may be practiced.

These embodiments are described in sufficient detail to enable those of ordinary skill in the art to practice one or more embodiments of this disclosure. It is to be understood that other embodiments may be utilized and that process and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 108 may reference element "8" in FIG. 1, and a similar element may be referenced as 208 in FIG. 2.

As used herein, "a" or "a number of" something can refer to one or more such things. For example, "a number of apertures" can refer to one or more apertures. As used herein, "a plurality of" means two or more things.

Figure 2:
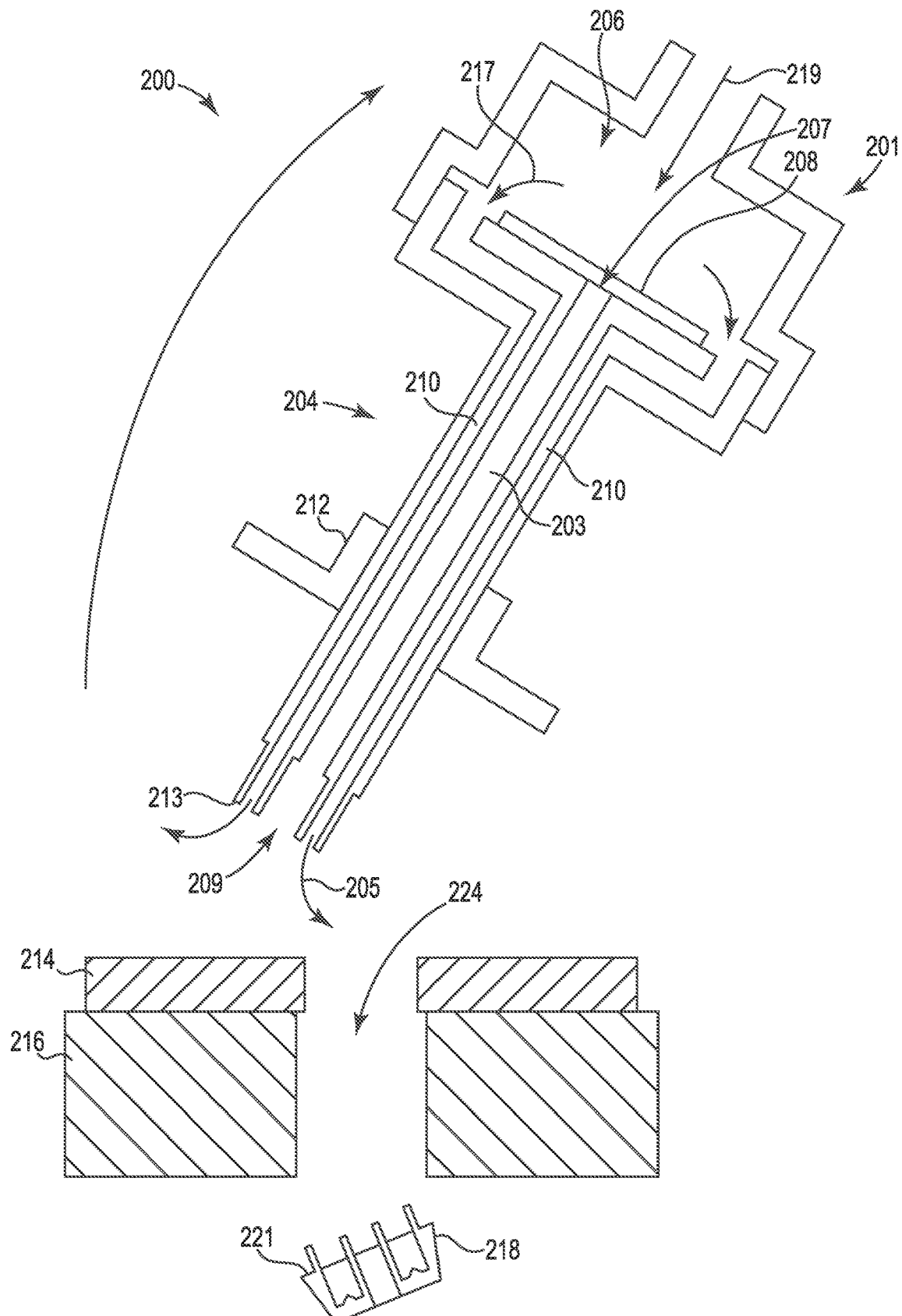
FIG. 2 illustrates a cutaway side view of a sample point according to an embodiment of the present disclosure wherein the sample point's air seal has been broken thereby having the valve in a closed (outflow) position.

As discussed above, in some applications, such as prisons, hospitals, and schools, it may be desirable to position the entire body in or above the ceiling or within a wall, for example, to avoid tampering by occupants of the space to be sampled. However, the problem with positioning the entire body in or above the ceiling or within a wall is that the air drawn into the sample point will likely be air from above the ceiling or within the wall and not air from the area to be sampled, which renders the sample point ineffective. FIGS. 1 and 2 show one such design for overcoming this problem for such placement.

The embodiment of FIG. 1 resolves the issue of sampling the air above the ceiling or within a wall rather than the air in the area to be sampled by positioning a first air flow conduit 103 in a shaft 104. The conduit 103 has two ends and the ends being open, to allow air to pass through the first air flow conduit 103 between an area to be sampled below the ceiling or outside a wall and the chamber 106.

FIG. 1 illustrates a cutaway side view of a sample point according to an embodiment of the present disclosure wherein the sample point has an air seal that allows a valve to operate in an open (inflow) position. In this embodiment, the smoke detection sample point 100 has a body 101 including a chamber portion 111 having a chamber 106 formed therein and a shaft portion 104 having a first air flow conduit 103 therein having two ends 107 and 109 and the ends being open, to allow air to pass through the first air flow conduit 103 between an area to be sampled (in this illustration, the area below ceiling 116) and the chamber 106, and a second air flow conduit 110 formed within the body 101 having two ends with one end being open and the second air flow conduit 110 having an air seal, to prevent air from passing through the second air flow conduit 110 between the area to be sampled (the area below ceiling 116) and the chamber 106.

In the embodiment of FIG. 1, the body 101 has a breakaway end cap 118 that provides an air seal to restrict movement of air through second air flow conduit 110 while providing an opening for the first air flow conduit 103 to allow air to pass through the first air flow conduit 103 between an area to be sampled (in this illustration, the area below ceiling 116) and the chamber 106. The breakaway end cap 118 is attached such that it can be removed from the end of the shaft 104, thereby removing the air seal from the second air flow conduit 110, as illustrated and discussed in more detail with respect to FIG. 2.

In some embodiments the first air flow conduit 103 and second air flow conduit 110 can be coaxial along axis 125. Such an arrangement has the benefit of reducing the overall size of the shaft, among other benefits.

As used herein, an air seal is a physical structure that prohibits or severely restricts air flow through the second air flow conduit 110. In the example of FIG. 1, the air seal is created by the positioning of the end cap over the end of the shaft and the interaction between the inner surfaces of the end cap with the outer surfaces of the shaft and walls 102 and 115 forming conduits 103 and 110, respectively. A severe restriction would be any restriction that would allow the central analysis device to determine a difference between when the cap is in position and when it has been dislodged.

As illustrated in FIG. 1, the sample point also includes a valve 108 positioned within the body 101 to regulate air flow between the first air flow conduit 103 and the chamber 106. Although it can be in any suitable location that regulates such flow, it can be inside the chamber 106 abutting the end 107 of the first air flow conduit 103, as illustrated in FIG. 1. A test to determine whether the device 100 is operating properly can be accomplished, for example, by reversing the air flow direction of the smoke detector system (via a pump at the central analysis device) such that when an outflow of air is applied to the valve, the valve 108 restricts movement of air 119 through the chamber 106 and into the first air flow conduit 103.

The smoke detection sample point device can be affixed in position within the building in any suitable manner. For example, as shown in FIGS. 1 and 2, the first air flow conduit 103 is positioned in a shaft 104 that passes through an aperture formed in a wall or ceiling surface of a building (FIG. 2 shows the smoke detection sample point device removed from the aperture 224 in the ceiling 216).

In some embodiments, the shaft 104 has a breakaway end cap 118 thereon that includes a 121 flange having a surface that engages an outer surface of the wall or ceiling 116. In various embodiments, the shaft can also include a backing member 112 positioned to slide along an outer surface of the shaft 104 and having a contact surface 122 to contact an inner surface of the wall or ceiling 126.

The backing member 112 can, for example, be a backing nut having interior threads and being positioned to slide along an outer surface of the shaft 104 and thread onto complimentary threading provided on the outer surface of the shaft. Some embodiments also include a gasket 114 that can have a contact surface 123 to contact an inner surface of the wall or ceiling 126. In such an embodiment, the contact surface 122 of the backing member 112 will contact a top surface 127 of the gasket 114.

The shaft 104 can be designed to have a breakaway end cap 118 that provides the air seal and has an engagement surface 121 that engages an outer surface of the wall or ceiling 128. In such embodiments, the breakaway end cap 118 is attached such that it can be removed from the end of the shaft 104 thereby removing the air seal from the second air flow conduit 110, as illustrated in FIG. 2.

This can be accomplished wherein the shaft has a breakaway end cap 118 that includes a flange 121 having a surface that engages an outer surface of the wall or ceiling 128. In such embodiments, the shaft can also include a backing member 112 positioned to slide along an outer surface of the shaft 104 and having a contact surface 122 to contact an inner surface of the wall or ceiling 126 (or a surface of a gasket or other spacing structure interposed between the backing member and the wall or ceiling material).

In another embodiment, the smoke detection sample point can include a body having a chamber portion having a chamber formed therein and a shaft having a first air flow conduit therein having two ends and the ends being open, to allow air to pass through the first air flow conduit between an area to be sampled and the chamber and a second air flow conduit formed within the body having two ends with one end being open and having an air seal, to prevent air from passing through the second air flow conduit between the area to be sampled and the chamber.

In such an embodiment, the shaft has a breakaway end cap that provides the air seal and has an engagement surface that engages an outer surface of the wall or ceiling. The breakaway end cap is attached such that it will be removed from the end of the shaft, thereby removing the air seal from the second air flow conduit. This results in a pressure difference that will be perceptible by the central analysis device.

As in the embodiment illustrated in FIG. 1, the shaft can include a backing member having a contact surface to contact an inner surface of the wall or ceiling. And, in such an embodiment, the sample point is fixed in relation to the wall or ceiling based on the engagement of the engagement surface and the outer surface of the wall or ceiling and the contact of the contact surface and the inner surface of the wall or ceiling.

In FIG. 1, the body 101 is positioned above ceiling 116 with the exception of a breakaway end cap 118. Although the breakaway end cap can be affixed to the end of the shaft 104 in any suitable manner to allow it to detach from the end of the shaft under the conditions described herein, on example is shown in FIG. 1. In this example, the end cap has one or more barbs 120 that mechanically interact with complementary features on the shaft to releasably affix the end cap to the shaft. In order to cause the end cap 118 to breakaway from the end of the shaft 104, a force (e.g., from a person tampering with the device 100 must exert a force on the shaft sufficient to overcome the mechanical interaction between the shaft 104 and the end cap 118, thereby breaking the barbs or frictionally disengaging them from the end of the shaft. When that occurs, the end cap is released from the shaft as shown in FIG. 2.

Further, during a leak check, when air flow is reversed and the flow is restricted, the system will register that there is no leak. The air 119 is, further, drawn from the area in the chamber 106 into a tube that is connected to the top opening into the chamber 106 where the air 119 is shown. The air 119 is then conveyed to the central analysis device (not shown). To accomplish this, the central analysis device includes a reversable pump that draws air from the sample point to the central analysis device or reverses to push air to the sample point, for cleaning and leak checking, for example.

In order to test to see if the system is working properly, the central analysis device can compare air pressure values of the air currently being drawn through the tube and a threshold value stored in memory, either on the central analysis device or stored remotely. Although not shown in the drawings, an example of one suitable central analysis device is the central detector unit of the VESDA E VEA system manufactured by Honeywell.

FIG. 2 illustrates a cutaway side view of a sample point according to an embodiment of the present disclosure wherein the sample point's air seal has been broken thereby having the valve in a closed (outflow) position.

To check for leaks, the central analysis device senses the restricted outward air flow for a given air pressure (due to the closure of the valve 208) and determines that there are no leaks, based on the air flow characteristics (flow versus pressure) measured being within an acceptable range indicating no leaks are present. If the outward air flow remains above a limit for a given pressure, or if the required pressure cannot be achieved, the central analysis device determines that a leak is present somewhere in either: the tube between the central analysis device and the sample point 200, the body 201, or the valve 208.

FIG. 2 illustrates a leak checking operation where the reversed air 219 is pushed out of the tube and into the chamber 206. In the embodiment of FIG. 1, the reversed air pushes the flap of the valve 108 closed, restricting the passing of air out of the chamber 106 (through the end 107 of first air flow conduit 103 and out end 109). In doing so, the air pressure will rise and this current air pressure and associated outward flow reading can be compared by the central analysis device with an expected flow and pressure to determine whether a leak is present in the system.

In the embodiment of FIG. 2, similarly to FIG. 1, the reversed air pushes the flap of the valve 208 closed, restricting the passing of air out of the chamber 206 (through the end 207 of first air flow conduit 203 and out end 209). However, in this example, the end cap 218 has become dislodged from the end of the shaft 204 and contact between the flange 221, contact surface of backing member 212, and the surfaces of the ceiling or wall 216 and/or gasket 214 have become disconnected, allowing the shaft to be removed from aperture 224.

Since the breakaway end cap 218 is no longer providing the air seal, a leak 205 is created at the end 213 of the shaft 204 as air 219 is allowed to bypass the valve 208 restricting access the air flow conduit 203 and travel into 217 and through the second air flow conduit 210. This will result in a pressure drop the will be perceptible to the central analysis device and therefore the leak will be detected by the system and a technician can be scheduled to visit the building to fix the sample point or replace it with a new one. Through use of such embodiments, the number of visual inspections can be reduced or eliminated since the system can detect when a cap of a sample point has been removed or dislodged, among other benefits.

As can be understood from the above discussion, the embodiments of the present disclosure can provide other significant benefits with regard to leak detection for smoke detection systems using sample points as well as providing a sample point that is significantly hidden from view within the ceiling or wall of an area to be monitored for smoke and/or fire, which can be advantageous in some applications. These benefits include earlier, more accurate and reliable smoke detection, which can save property and, in some cases, the lives of the occupants of the area being sampled, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion and not a restrictive one. Combination of the above embodiments, and other embodiments not specifically described herein, will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A smoke detection sample point, comprising:
    a body including:
        a chamber formed within the body;
        a first air flow conduit formed within the body having two ends and the ends being open, to allow air to pass through the first air flow conduit between an area to be sampled and the chamber; and
        a second air flow conduit formed within the body having two ends with one end being open and having an air seal, to prevent air from passing through the second air flow conduit between the area to be sampled and the chamber; and
    wherein the sample point includes a valve positioned within the body to regulate air flow between the first air flow conduit and the chamber and when an outflow of air is applied to the valve, the valve restricts movement of air through the chamber.

2. The smoke detection sample point of claim 1, wherein the body has a breakaway end cap that provides the air seal.

3. The smoke detection sample point of claim 2, wherein the breakaway end cap is attached such that it will be removed from the end of the shaft thereby removing the air seal from the second air flow conduit.

4. The smoke detection sample point of claim 1, wherein the first air flow conduit is positioned in a shaft that passes through an aperture formed in a wall or ceiling surface of a building.

5. The smoke detection sample point of claim 4, wherein the shaft has a breakaway end cap thereon includes a flange having a surface that engages an outer surface of the wall or ceiling.

6. The smoke detection sample point of claim 5, wherein the shaft also includes a backing member positioned to slide along an outer surface of the shaft and having a contact surface to contact an inner surface of the wall or ceiling.

7. The smoke detection sample point of claim 5, wherein the shaft also includes a backing nut positioned to slide along an outer surface of the shaft and a gasket having a contact surface to contact an inner surface of the wall or ceiling.

8. A smoke detection sample point, comprising:
    a body including:
        a chamber portion having a chamber formed therein; and
        a shaft having:
            a first air flow conduit therein having two ends and the ends being open, to allow air to pass through the first air flow conduit between an area to be sampled and the chamber; and
            a second air flow conduit formed within the body having two ends with one end being open and having an air seal, to prevent air from passing through the second air flow conduit between the area to be sampled and the chamber; and
    wherein the sample point includes a valve positioned within the body to regulate air flow between the first air flow conduit and the chamber and when an outflow of air is applied to the valve, the valve restricts movement of air through the chamber.

9. The smoke detection sample point of claim 8, wherein the shaft has a breakaway end cap that provides the air seal and has an engagement surface that engages an outer surface of the wall or ceiling.

10. The smoke detection sample point of claim 9, wherein the breakaway end cap is attached such that it will be removed from the end of the shaft thereby removing the air seal from the second air flow conduit.

11. The smoke detection sample point of claim 8, wherein the shaft has a breakaway end cap that includes a flange having a surface that engages an outer surface of the wall or ceiling.

12. The smoke detection sample point of claim 11, wherein the shaft also includes a backing member positioned to slide along an outer surface of the shaft and having a contact surface to contact an inner surface of the wall or ceiling.

13. The smoke detection sample point of claim 12, wherein the backing member is selected from the group including a gasket and backing nut.

14. A smoke detection sample point, comprising:
    a body including:
        a chamber portion having a chamber formed therein; and
        a shaft having:
            a first air flow conduit therein having two ends and the ends being open, to allow air to pass through the first air flow conduit between an area to be sampled and the chamber; and
            a second air flow conduit formed within the body having two ends with one end being open and having an air seal, to prevent air from passing through the second air flow conduit between the area to be sampled and the chamber; and
            wherein the shaft has a breakaway end cap that provides the air seal and having an engagement surface that engages an outer surface of the wall or ceiling; and
    wherein the sample point includes a valve positioned within the body to regulate air flow between the first air flow conduit and the chamber and when an outflow of air is applied to the valve, the valve restricts movement of air through the chamber.

15. The smoke detection sample point of claim 14, wherein the breakaway end cap is attached such that it will be removed from the end of the shaft thereby removing the air seal from the second air flow conduit.

16. The smoke detection sample point of claim 14, wherein the shaft includes a backing member having a contact surface to contact an inner surface of the wall or ceiling.

17. The smoke detection sample point of claim 16, wherein the sample point is fixed in relation to the wall or ceiling based on the engagement of the engagement surface and the outer surface of the wall or ceiling and the contact of the contact surface and the inner surface of the wall or ceiling.

18. The smoke detection sample point of claim 14, wherein the sample point includes a valve positioned within the body to regulate air flow between the first air flow conduit and the chamber.

\* \* \* \* \*